(12) United States Patent
Muraoka

(10) Patent No.: US 9,203,995 B2
(45) Date of Patent: Dec. 1, 2015

(54) HINGE UNIT AND IMAGE READING APPARATUS AND IMAGE FORMING APPARATUS INCLUDING THE SAME

(71) Applicant: KYOCERA Document Solutions Inc., Osaka (JP)

(72) Inventor: Toshinori Muraoka, Osaka (JP)

(73) Assignee: KYOCERA Document Solutions, Inc., Osaka (JP)

( * ) Notice: Subject to any disclaimer, the term of this patent is extended or adjusted under 35 U.S.C. 154(b) by 0 days.

(21) Appl. No.: 14/303,750

(22) Filed: Jun. 13, 2014

(65) Prior Publication Data

US 2015/0015920 A1 Jan. 15, 2015

(30) Foreign Application Priority Data

Jul. 10, 2013 (JP) ................................. 2013-144687

(51) Int. Cl.
*G06F 3/12* (2006.01)
*H04N 1/00* (2006.01)

(52) U.S. Cl.
CPC ....... *H04N 1/00543* (2013.01); *H04N 1/00554* (2013.01)

(58) Field of Classification Search
None
See application file for complete search history.

(56) References Cited

U.S. PATENT DOCUMENTS

| 4,691,584 | A * | 9/1987 | Takaishi et al. ........... E05B 1/06 292/144 |
| 6,351,624 | B1 * | 2/2002 | Hiruta .................. G03G 15/605 355/75 |
| 6,363,576 | B1 * | 4/2002 | Hsu et al. .................. E05D 1/06 16/239 |
| 6,427,500 | B1 * | 8/2002 | Weinerman et al. ...... B60J 7/198 292/196 |
| 6,972,878 | B2 * | 12/2005 | Shyu .................. H04N 1/00519 16/239 |
| 7,804,628 | B2 * | 9/2010 | Hashimoto et al. .................. H04N 1/00543 358/400 |
| 7,855,814 | B2 * | 12/2010 | Osakabe et al. ... H04N 1/00519 358/474 |
| 7,894,748 | B2 * | 2/2011 | Su et al. ............. H04N 1/00519 399/125 |
| 7,949,292 | B2 * | 5/2011 | Choi .................. H04N 1/00519 16/277 |
| 8,379,278 | B2 * | 2/2013 | Kawai ................ H04N 1/00519 271/278 |

(Continued)

FOREIGN PATENT DOCUMENTS

JP 2008-268521 A 11/2008

OTHER PUBLICATIONS

The extended European search report issued by the European Patent Office on Jun. 17, 2015, which corresponds to European Patent Application No. 14171905.4-1903 and is related to U.S. Appl. No. 14/303,750.

*Primary Examiner* — Ted Barnes
(74) *Attorney, Agent, or Firm* — Studebaker & Brackett PC

(57) ABSTRACT

A hinge unit includes a support member, a mount member and a detachment restricting member. The support member configured to support a document pressor pressing a document to a document placing surface provided on a housing openably/closably with respect to the document placing surface. The mount member linked turnably to the support member and mounted removably to the housing. The detachment restricting member whose one end part is connected to the support member and including an engage movable member forming an engage part at another end. The detachment restricting member restricting the mount member from being detached from the housing in a case where the document pressor is closed, and allowing the mount member to detach from the housing in a case where the document pressor is opened.

12 Claims, 10 Drawing Sheets

(56) References Cited

U.S. PATENT DOCUMENTS

| | | | | |
|---|---|---|---|---|
| 8,457,527 B2* | 6/2013 | Takata | G03G 15/605 | 16/286 |
| 8,610,910 B2* | 12/2013 | Nishikawa | H04N 1/00519 | 358/1.13 |
| 8,977,164 B2* | 3/2015 | Hsiung | H04N 1/00551 | 399/125 |
| 9,065,946 B2* | 6/2015 | Inada et al. | H04N 1/00625 | 1/1 |
| 9,100,521 B2* | 8/2015 | Yamamoto et al. | G03G 15/605 | 1/1 |
| 2002/0118404 A1* | 8/2002 | Shyu | H04N 1/00519 | 358/498 |
| 2002/0164197 A1* | 11/2002 | Lee | E05D 3/022 | 403/65 |
| 2004/0218229 A1* | 11/2004 | Chol | H04N 1/00519 | 358/474 |
| 2005/0196208 A1* | 9/2005 | Lin | H04N 1/00554 | 399/362 |
| 2006/0130277 A1* | 6/2006 | Nelson et al. | E05D 11/1007 | 16/327 |
| 2006/0139703 A1* | 6/2006 | Kurokawa et al. | H04N 1/00519 | 358/474 |
| 2006/0215235 A1* | 9/2006 | Li | H04N 1/00519 | 358/474 |
| 2006/0222435 A1* | 10/2006 | Ha et al. | H04N 1/00519 | 400/691 |
| 2006/0274382 A1* | 12/2006 | Yang | H04N 1/00522 | 358/474 |
| 2007/0195381 A1* | 8/2007 | Yamazaki et al. | H04N 1/00559 | 358/502 |
| 2007/0201109 A1* | 8/2007 | Osakabe et al. | H04N 1/00519 | 358/474 |
| 2007/0216170 A1* | 9/2007 | Drescher et al. | E05B 3/16 | 292/201 |
| 2008/0196635 A1* | 8/2008 | Piretti | A47B 7/02 | 108/118 |
| 2010/0014127 A1* | 1/2010 | Osakabe et al. | H04N 1/00519 | 358/497 |
| 2010/0061758 A1* | 3/2010 | Kakuta | G03G 21/1642 | 399/110 |
| 2010/0085608 A1* | 4/2010 | Enomoto | H04N 1/00519 | 358/400 |
| 2011/0075178 A1* | 3/2011 | Nishikawa | H04N 1/00519 | 358/1.13 |
| 2011/0176124 A1* | 7/2011 | Takata | G03G 15/605 | 355/75 |
| 2011/0235131 A1* | 9/2011 | Hanamoto et al. | H04N 1/00519 | 358/474 |
| 2012/0161453 A1* | 6/2012 | Zysk et al. | E05B 83/24 | 292/21 |
| 2013/0121741 A1* | 5/2013 | Shibata | G03G 15/605 | 399/380 |
| 2014/0009052 A1* | 1/2014 | Ohama et al. | B41J 29/13 | 312/326 |
| 2014/0023416 A1* | 1/2014 | Suzuki | H04N 1/00554 | 399/380 |
| 2014/0355084 A1* | 12/2014 | Inada et al. | H04N 1/00625 | 358/498 |

* cited by examiner

HINGE UNIT AND IMAGE READING APPARATUS AND IMAGE FORMING APPARATUS INCLUDING THE SAME

INCORPORATION BY REFERENCE

This application is based on and claims the benefit of priority from Japanese Patent application No. 2013-144687 filed on Jul. 10, 2013, the entire contents of which are incorporated herein by reference.

BACKGROUND

The present disclosure relates to a hinge unit and to an image reading apparatus and an image forming apparatus including the same suitably used in a multi-function printer, a printer, a scanner, or the like including a document pressor.

Hitherto, there is known an image forming apparatus or the like including a hinge unit and configured to turnably support a document pressor through the hinge unit to exposure a contact glass on an upper surface of an body of the apparatus (referred to simply as an 'apparatus body' hereinafter) and to press a document on the contact glass.

For instance, there is a document pressing plate opening/closing device as a type of hinge unit including a support member configured to support the document pressing plate, a leg part turnably linked to the support member and inserted into the body of the apparatus, a guide groove extending vertically along a side face of the leg part, and a roller member guided by the guide groove. This document pressing plate opening/closing device is configured such the leg part is not slipped out of the apparatus body by engaging the roller member with the guide groove.

By the way, a maintenance work of office machines such as a copier is carried out periodically in general. At that time, there is a case where the document pressing plate is removed out of the apparatus body. However, because the leg part of the document pressing plate closing/opening device described above cannot be pulled out of the apparatus body, the document pressing plate cannot be readily removed during the maintenance work. Due to that, an operator cannot complete the maintenance work efficiently in a short time.

SUMMARY

A hinge unit according to one aspect of the present disclosure includes a support member, a mount member and a detachment restricting member. The support member configured to support a document pressor pressing a document to a document placing surface provided on a housing of an apparatus body openably/closably with respect to the document placing surface. The mount member linked turnably to the support member and mounted removably to the housing. The detachment restricting member whose one end part is connected to the support member and including an engage movable member forming an engage part at another end. The detachment restricting member restricts the mount member from being detached from the housing by moving the engage part to an engage position where the engage part can abut against an engaged part formed on the housing in a case where the document pressor is closed. The detachment restricting member also allows the mount member to detach from the housing by moving the engage part to a release position where the engage part cannot abut against the engaged part in a case where the document pressor is opened.

An image reading apparatus according to one aspect of the present disclosure includes a hinge unit. The hinge unit includes a support member, a mount member and a detachment restricting member. The support member configured to support a document pressor pressing a document to a document placing surface provided on a housing of an apparatus body openably/closably with respect to the document placing surface. The mount member linked turnably to the support member and mounted removably to the housing. The detachment restricting member whose one end part is connected to the support member and including an engage movable member forming an engage part at another end. The detachment restricting member restricts the mount member from being detached from the housing by moving the engage part to an engage position where the engage part can abut against an engaged part formed on the housing in a case where the document pressor is closed. The detachment restricting member also allows the mount member to detach from the housing by moving the engage part to a release position where the engage part cannot abut against the engaged part in a case where the document pressor is opened.

An image forming apparatus according to one aspect of the present disclosure includes a hinge unit. The hinge unit includes a support member, a mount member and a detachment restricting member. The support member configured to support a document pressor pressing a document to a document placing surface provided on a housing of an apparatus body openably/closably with respect to the document placing surface. The mount member linked turnably to the support member and mounted removably to the housing. The detachment restricting member whose one end part is connected to the support member and including an engage movable member forming an engage part at another end. The detachment restricting member restricts the mount member from being detached from the housing by moving the engage part to an engage position where the engage part can abut against an engaged part formed on the housing in a case where the document pressor is closed. The detachment restricting member also allows the mount member to detach from the housing by moving the engage part to a release position where the engage part cannot abut against the engaged part in a case where the document pressor is opened.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Embodiments of the present disclosure will be described with reference to the drawings. It is noted that in the following description, respective directions are defined by arrows shown in the figures for the sake of convenience.

Figure 1:
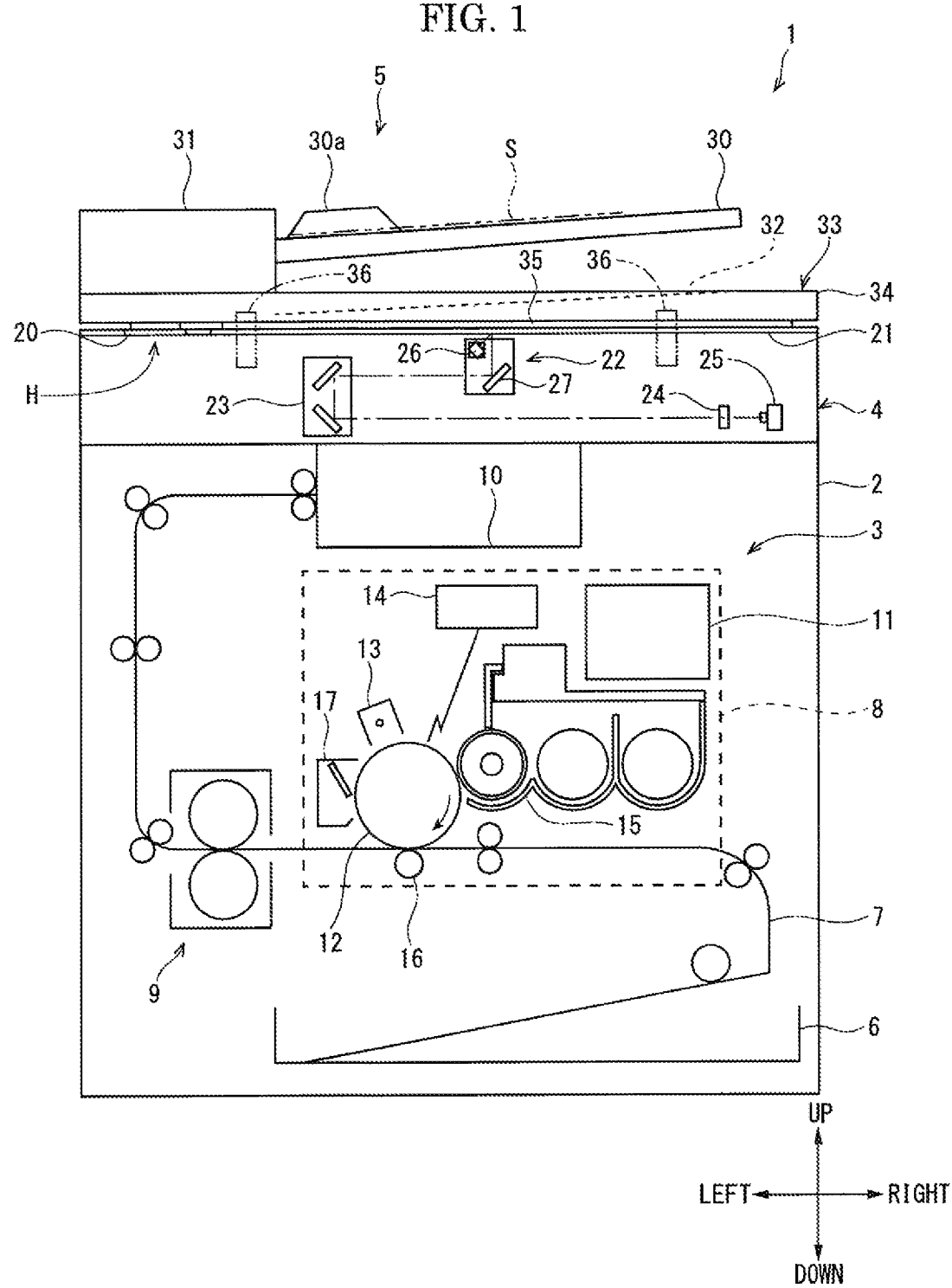
FIG. 1 is a sectional view schematically showing a multi-function printer according to a first embodiment of the present disclosure.

With reference to FIG. 1, a multi-function printer according to a first embodiment of the present disclosure will be descried. FIG. 1 is a sectional view schematically showing a multi-function printer 1.

A multi-function printer 1 is composed of an imaging apparatus 3, an image reading apparatus 4 and others stored in a body 2 of the apparatus (referred to simply as an 'apparatus body' 2 hereinafter). The apparatus body 2, i.e., a housing, is formed substantially into a shape of a box. An automatic document feeder 5 is mounted on an upper plate 2a of the apparatus body 2 (refer to FIG. 4 and others). The automatic document feeder 5 feeds documents S one by one to an image reading position H of the image reading apparatus 4.

The imaging unit 3, i.e., the image forming apparatus, includes a sheet storage part 6, an image forming part 8, a fixing unit 9, and a sheet discharge part 10. The sheet storage part 6 is configured to store sheets. The image forming part 8 is configured to transfer a toner image to a sheet supplied from the sheet storage part 6 to a conveying path 7. The fixing unit 9 is configured to fix the toner image transferred to the sheet. The sheet discharge part 10 stores the discharged sheet on which the toner image has been fixed. It is noted that a document S and the sheet described above is not limited to a recording medium made of paper and may include such recording medium as a resin film or an overhead projector (OHP) sheet and the like.

The image forming part 8 performs a monochrome image forming process for example on a basis of image data transmitted from a personal computer not shown or the image reading apparatus 4. The image forming part 8 also includes a toner container 11 storing replenished toner (developer: black). The image forming part 8 includes a photosensitive drum 12, a charge unit 13, a transfer roller 16, and a cleaning unit 17. The photosentitive drum 12, i.e., an image carrier, is installed to be rotatable. The charge unit 13, the exposure unit 14, the developer 15, the transfer roller 16 and the cleaning unit 17 are disposed around the photosentitive drum 12 in order of its transferring process.

The image reading apparatus 4 includes a contact glass 20, a platen glass 21, an optical scanning unit 22, a reflecting unit 23, a condenser lens 24, and a charge coupled device (CCD) 25. The contact glass 20 and the platen glass 21 are fixed on an upper plate 2a of the apparatus body 2. The optical scanning unit 22 is provided so as to be able read the document S on the respective glasses 20 and 21. The reflecting unit 23 reflects a light beam emitted from the optical scanning unit 22. The CCD 25 receives the reflected light beam through the condenser lens 24. It is noted that the condenser lens 24 and the CCD 25 are fixed.

The optical scanning unit 22 includes a light source 26 and a reflecting part 27. The light source 26 irradiates light toward the document S and the reflecting part 27 directs the light reflected by the document S to the reflecting unit 23. An image on the document S is transformed into electrical signals as the light reflected by the document S is inputted to the CCD 25.

The optical scanning unit 22 reads the document S (the image thereof) fed by the automatic document feeder 5 and passing through on the contact glass 20 while being fixed at an image reading position H. The optical scanning unit 22 also reads the document S placed on the platen glass 21 by scanning in a right-hand direction from the image reading position H in FIG. 1. At this time, the reflecting unit 23 moves in a same direction with the optical scanning unit 22 and by a half of a distance such that an optical path length from the document S to the condenser lens 24 is made constant.

The automatic document feeder 5 includes a supply tray 30, a conveying mechanism 31, a discharge tray 32, and a document cover 33. The document S is placed on the supply tray 30. The conveying mechanism 31 feeds the document S on the supply tray 30 to the image reading apparatus 4. The discharge tray 32 receives the document S whose image has been read. The document cover 33, i.e., a document pressor, supports the conveying mechanism 31 and the discharge tray 32.

The supply tray 30 is formed into a saucer-like shape made of resin so as to be able to stack plurality of documents S. The supply tray 30 extends in the right-hand direction in FIG. 1 from an upper part of the conveying mechanism 31. That is, the supply tray 30 is inclined slightly downward toward the conveying mechanism 31. A pair of document conveying guides 30a sliding in a width direction (direction orthogonal to a sheet conveying direction) and restricting the stacked document S in the width direction is provided on a document stacking surface of the supply tray 30.

The conveying mechanism 31 includes a document conveying path not shown formed substantially into a shape of U folded back so as to communicate the supply tray 30 with the discharge tray 32. The conveying mechanism 31 also includes a plurality of rollers or the like not shown that is disposed along the document conveying path and is rotated to conveying the document S.

The discharge tray 32 is formed into a saucer-like shape so as to be able to receive the documents S to be discharged. The discharge tray 32 is disposed below the supply tray 30 and is formed such that a document S receiving surface thereof is substantially in parallel with the supply tray 30.

The document cover 33 presses the document S to the platen glass 21 (i.e., a document placing surface) provided on the upper plate 2a of the apparatus body 2. The document cover 33 is provided under the conveying mechanism 31 and the discharge tray 32 and includes at the cover frame 34, a mat 35 and a pair of right and left hinge units 36. The cover frame 34 is formed substantially into a rectangular plain plate. The mat 35 is provided so as to face an under surface of the cover frame 34, and the pair of right and left hinge units 36 is provided on a back surface of the cover frame 34.

The cover frame 34 is formed of a resin material on a same plane with the conveying mechanism 31 and the discharge tray 32. The mat 35 is formed of an elastic resin material into a rectangular plate shape smaller than the cover frame 34. It is noted that details of each hinge unit 36 will be described later.

The document cover 33 is attached to the upper surface of the apparatus body 2 through the pair of right and left hinge units 36. That is, the automatic document feeder 5 turns centering on the rotating shaft of each hinge unit 36. The upper surfaces of the contact glass 20 and the platen glass 21 are exposed are exposed by turning and lifting a front side of the automatic document feeder 5. When the document S is placed on the platen glass 21 and the automatic document feeder 5 is closed, the document S is pressed from by the mat 35.

An image forming process of the multi-function printer 1 will be briefly explained. Image data read by the image reading apparatus 4 and photoelectrically converted is outputted from the image reading apparatus 4 to the imaging unit 3. The charge unit 13 charges the surface of the photosensitive drum 12. The exposure unit 14 exposes the photosensitive drum 12 corresponding to the image data. Thereby, an electrostatic latent image is formed on the photosentitive drum 12 and is then developed by the developer 15 as a toner image. Meanwhile, a sheet taken out of the sheet storage part 6 is conveyed to the conveying path 7. A transfer roller transfers the toner image on the conveyed sheet by applying a transfer bias. The fixing unit 9 fixes the toner image on the sheet. Then, the sheet on which the toner image has been fixed is discharged to the sheet discharge part 10. The cleaning unit 17 removes the toner remaining on the surface of the photosensitive drum 12 after the transfer.

Figure 2:
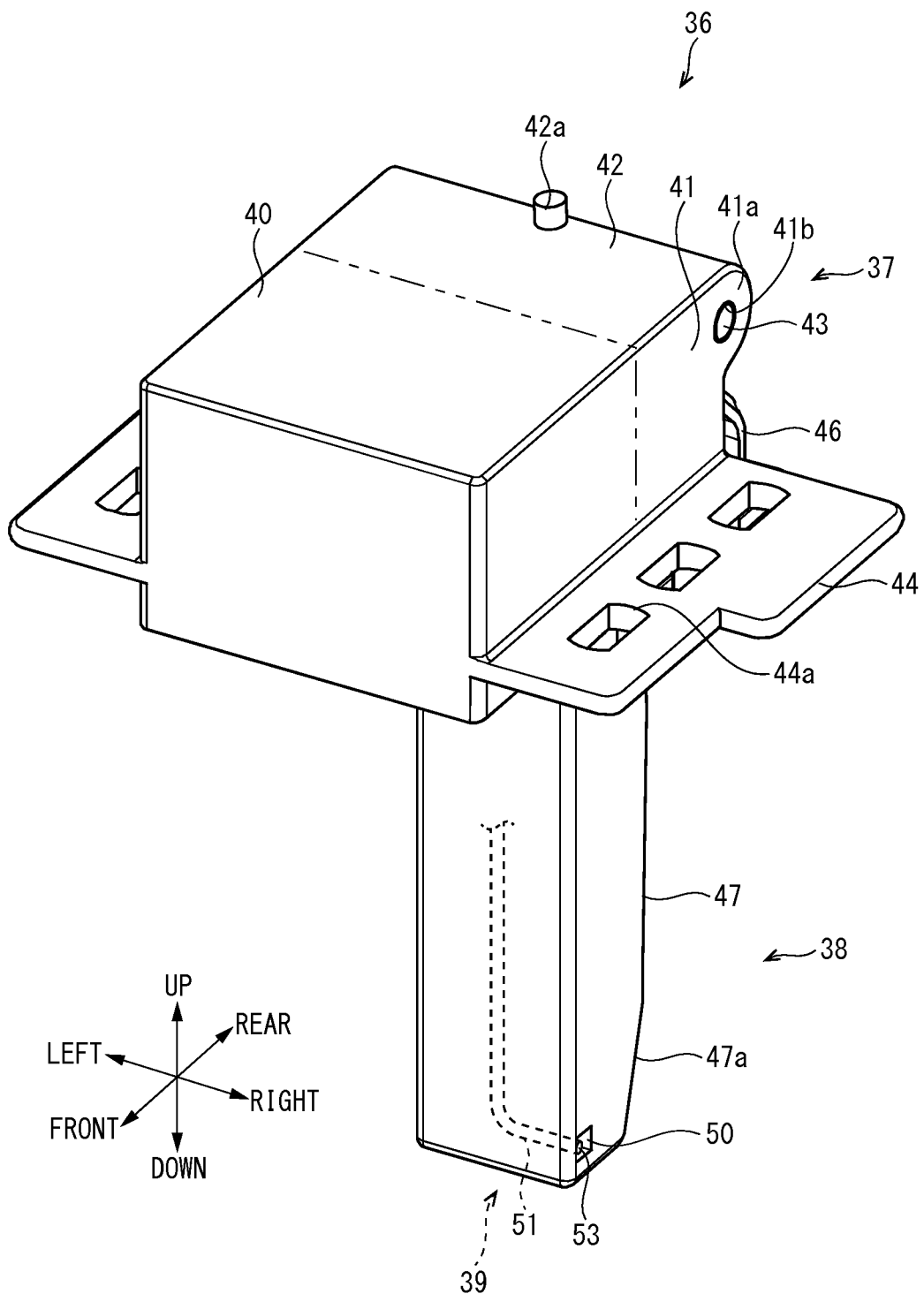
FIG. 2 is a perspective view showing a hinge unit according to the first embodiment of the present disclosure.
Figure 3:
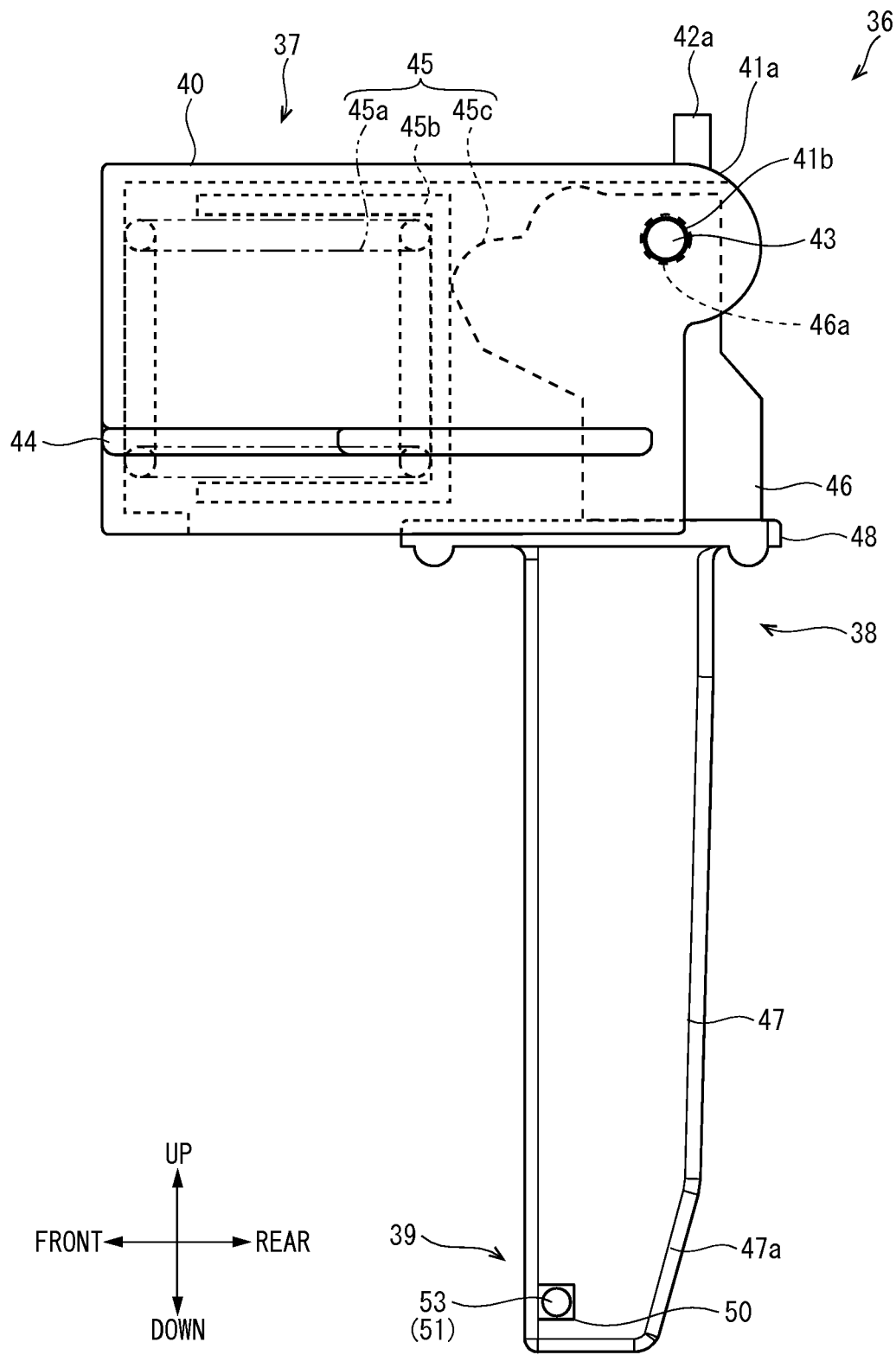
FIG. 3 is a side view showing the hinge unit of the first embodiment of the present disclosure.
Figure 4:
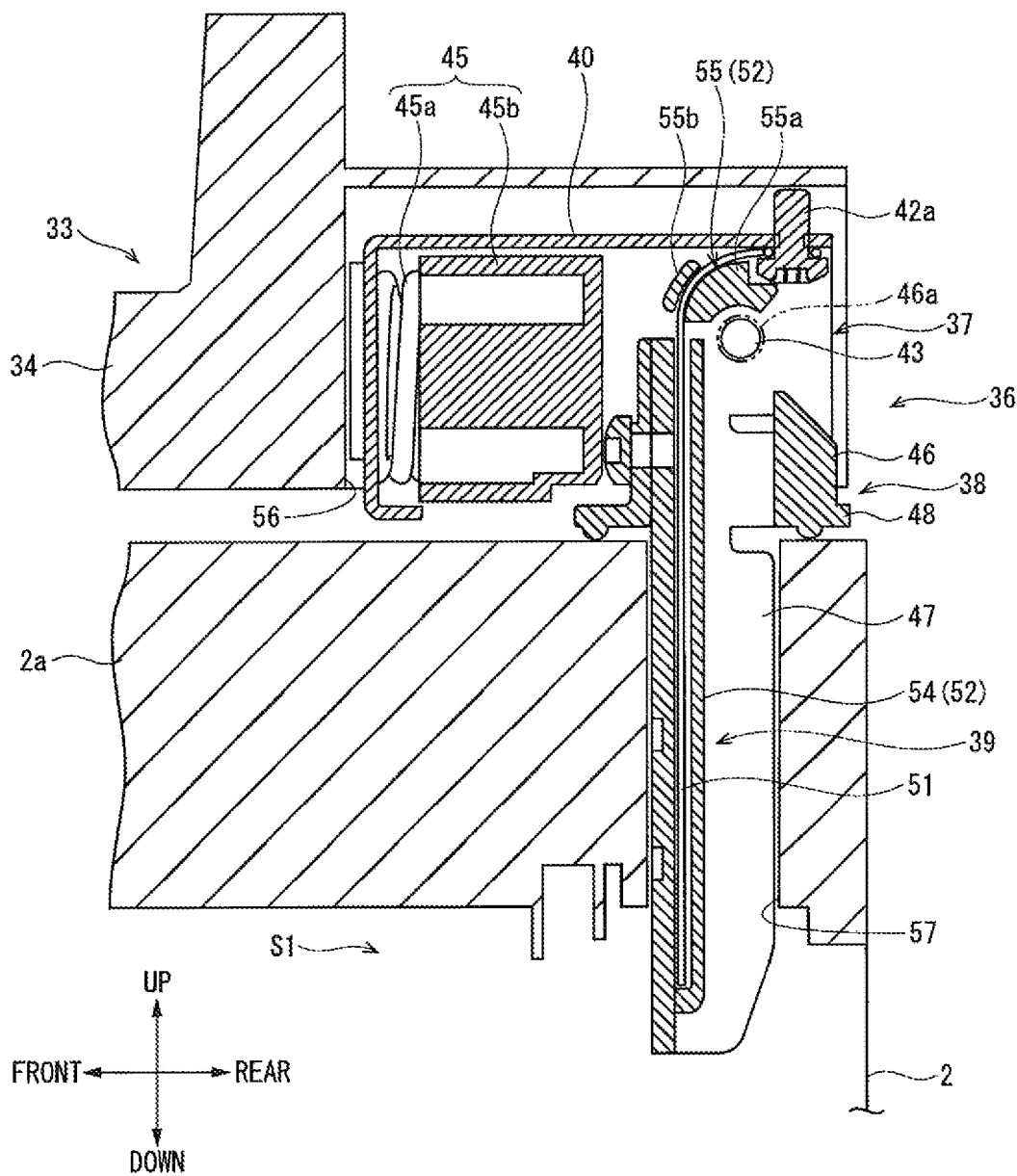
FIG. 4 is a side sectional view schematically showing the hinge unit of the first embodiment of the present disclosure in a state in which a document cover is closed.
Figure 5:
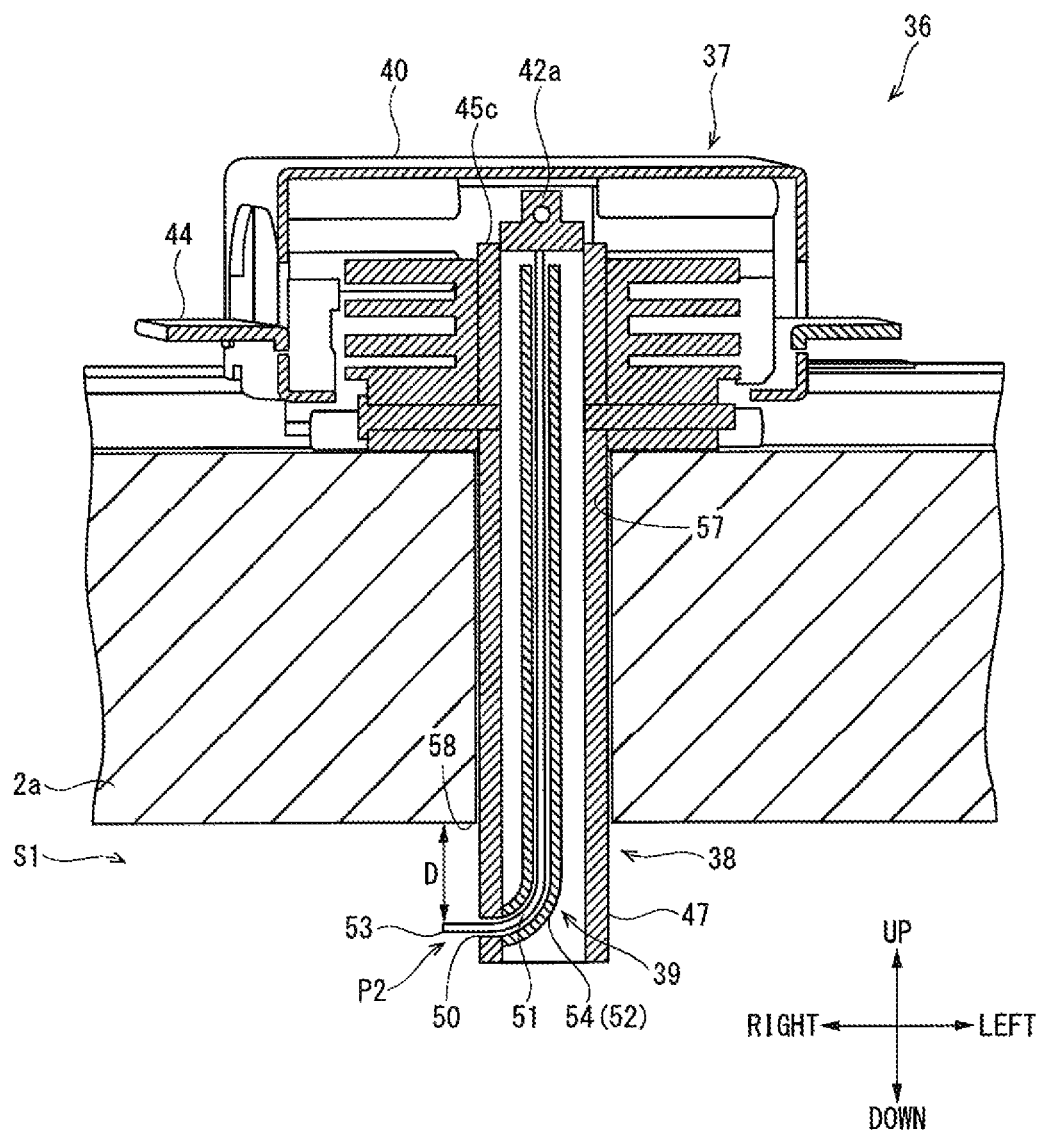
FIG. 5 is a rear sectional view schematically showing the hinge unit of the first embodiment of the present disclosure in the state in which the document cover is closed.
Figure 6:
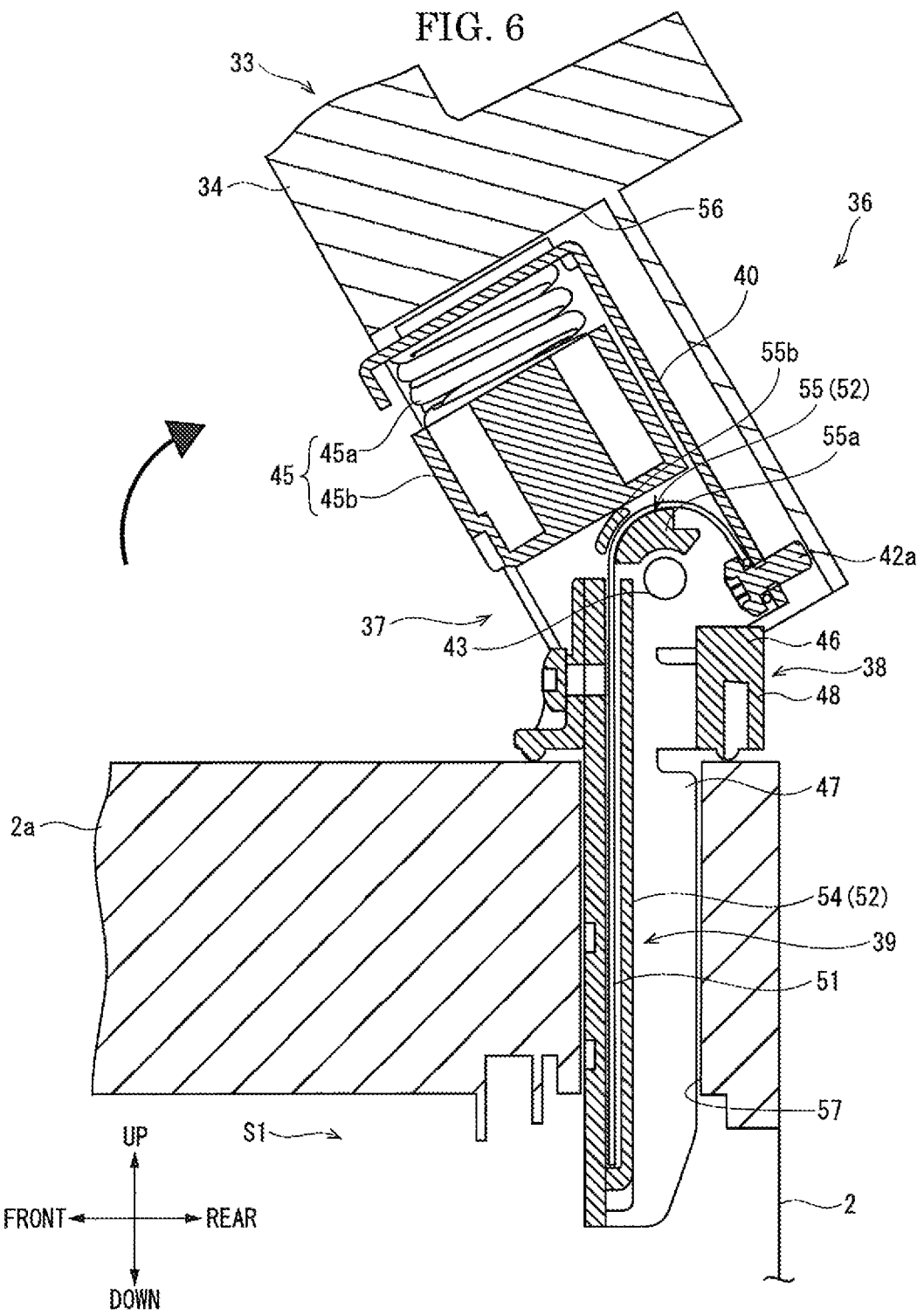
FIG. 6 is a side sectional view schematically showing the hinge unit of the first embodiment of the present disclosure in a state in which the document cover is opened.
Figure 7:
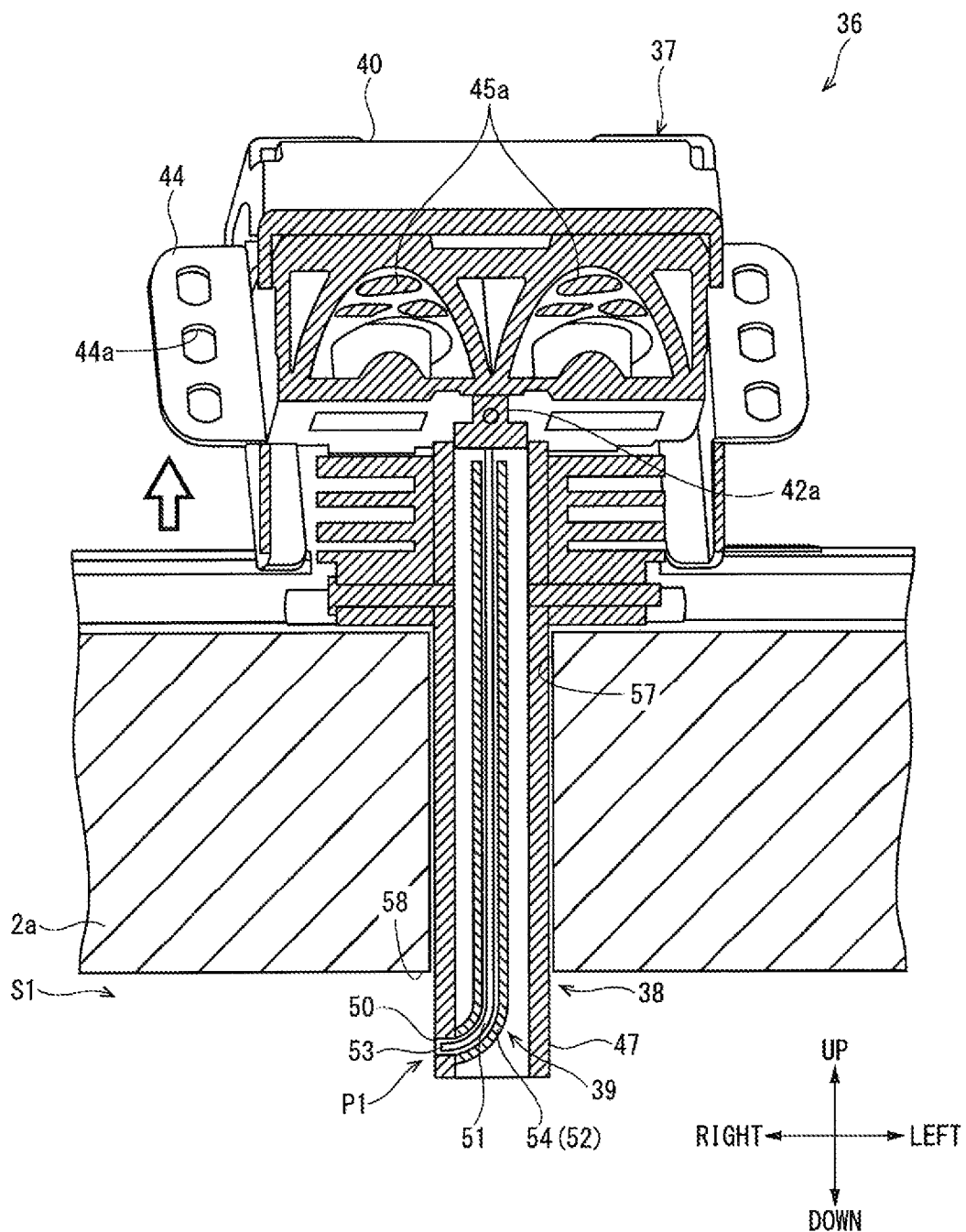
FIG. 7 is a rear sectional view schematically showing the hinge unit of the first embodiment of the present disclosure in the state in which the document cover is opened.

Next, the hinge unit 36 of the first embodiment will be described in detail with reference to FIGS. 2 through 7. FIG. 2 is a perspective view showing the hinge unit 36. FIG. 3 is a side view showing the hinge unit 36. FIG. 4 is a side sectional view schematically showing the hinge unit 36 (a state in which a document cover is closed). FIG. 5 is a rear sectional view schematically showing the hinge unit 36 (the state in which the document cover is closed). FIG. 6 is a side sectional view schematically showing the hinge unit 36 (a state in which the document cover is opened). FIG. 7 is a rear sectional view schematically showing the hinge unit 36 (the state in which the document cover is opened.). It is noted that the following explanation will be made on a basis of a condition in which the document cover 33 (the automatic document feeder 5) is closed.

The pair of hinge units 36 supports the document cover 33 openably with respect to the platen glass 21. The pair of hinge units 36 is disposed separately from each other along one side on a rear side of a back (undersurface) of the cover frame 34. It is noted that because the pair of hinge units 36 has a same structure, respectively, the following explanation will be made by noticing on one hinge unit 36.

As shown in FIGS. 2 and 3, the hinge unit 36 includes a support member 37, a mount member 38, and a detachment restricting mechanism 39. The support member 37 supports the document cover 33. The mount member 38 is linked turnably with the support member 37. The detachment restricting mechanism 39 includes a wire 51 whose upper end part (one end part) is connected with the support member 37 and whose lower end part (other end part) includes an engage part 53 (refer to FIGS. 4 and 5).

The support member 37 is integrally formed while including a fitting part 40, a pair of right and left bearing plates 41, a top plate 42, a rotating shaft 43, and a pair of right and left flange parts 44. The fitting part 40 is formed substantially into a shape of a rectangular box. The pair of right and left bearing plates 41 and the top board 42 is formed at a rear part of the fitting part 40. The rotating shaft 43 is provided between the pair of bearing plates 41. The pair of right and left flange parts 44 projects outwardly from a lower part of the fitting part 40 and each bearing plate 41.

As shown in FIGS. 3 and 4, the fitting part 40 is formed to be hollow. The fitting part 40 includes an assist mechanism 45 built therein and configured to assist an opening/closing operation of the document cover 33 (the automatic document feeder 5). The assist mechanism 45 includes a pair of right and left assist springs 45a, a spring support part 45b and an assist cam 45c. A front edge surface of each of the pair of right and left assist springs 45a (so-called coil springs) abuts against a front inner surface of the fitting part 40. The spring support part 45b supports each assist spring 45a. The assist cam 45c abuts against a rear end surface of the spring support part 45b. When the support member 37 is turned with respect to the mount member 38, the rear end surface of the spring support part 45b moves relatively along a cam surface of the assist cam 45c. The assist mechanism 45 assists the opening operation of the document cover 33 (the automatic document feeder 5) by utilizing a force stretching each compressed assist spring 45a (refer to FIG. 6).

As shown in FIGS. 2 and 3, the pair of bearing plates 41 is formed as a same plane with both right and left side surfaces of the fitting part 40 and extends rearward from a rear end of the fitting part 40, respectively. The pair of bearing plates 41 is disposed horizontally so as to face with each other. A shaft fixing part 41a which is a semi-circular plate when seen from a side is provided on an upper part of a rear end of each shaft supporting plate 41. A bearing hole 41b is formed so as to penetrate in the horizontal direction through each shaft fixing part 41a. A top board 42 is formed on a same plane with an upper face of the fitting part 40. The top board 42 extends across the pair of bearing plates 41.

A rotating shaft 43 is formed into a cylindrical shape. The rotating shaft 43 is inserted through shaft supporting holes 41b of the rotating shaft 43. The rotating shaft 43 becomes a turning axis for the mount member 38 to turn with respect to the support member 37.

The pair of flanges 44 extends respectively outwardly from lower positions of right and left outer side surfaces of the fitting part 40 and each bearing plates 41. Each flange 44 has three fastening holes 44a formed and arrayed in the front-rear direction.

As shown in FIGS. 2 and 3, the mount member 38 includes a bearing part 46 and a leg part 47. The bearing part 46 is provided integrally with an assist cam 45c. The leg part 47 extends downward from the bearing part 46.

As shown in FIG. 3, the assist cam 45c described above is provided in the bearing part 46 such that the assist cam 45c protrudes forward. The assist cam 45c has a bearing hole 46a so as to penetrate in the horizontal direction thereof. The rotating shaft 43 described above is inserted through the bearing hole 46a. That is, the rotating shaft 43 is journaled by each shaft bearing hole 41b and the bearing hole 46a. The support member 37 is supported turnably with respect to the mount member 38 through the rotating shaft 43. An insertion restricting part 48 protruding to the outside in the front-rear and right and left directions is formed at a lower part of the bearing part 46. It is noted that a projection projecting downward is formed on a lower face of the insertion restricting part 48.

As shown in FIGS. 2 and 3, the leg part 47 is formed substantially into a hollow square pillar shape. A tapered face 47a chamfered slant is formed at a rear side of a lower part of the leg part 47. A substantially rectangular wire opening 50 is formed so as to penetrate through a right side face of the lower part of the leg part 47. It is noted that the shape of the wire opening part 50 is arbitrary and the position where the wire opening part 50 is formed through is also arbitrary. For instance, the wire opening part 50 may be formed through a left side surface or at a front or rear surface.

As shown in FIGS. 4 and 5, the detachment restricting mechanism 39 includes a wire 51 and a wire guide 52. The wire 51, i.e., an engage movable member, has flexibility. The wire 51 moves in linkage with a turn of the support member 37 involved in opening/closing operation of the document cover 33. The wire guide 52 is provided in the mount member 38. The wire guide 52 guides the move of the wire 51.

The wire 51 is formed by twisting a plurality of metallic wire rods together. An upper end (one end) of the wire 51 is connected to a wire fixing part 42a provided on a back face (lower face) of the top board 42 of the support member 37. Still further, as shown in FIG. 5, an engage part 53 which is capable of going in and out of a wire opening part 50 is formed at a lower end (other end) of the wire 51. As shown in FIG. 4, in a case where an angle formed between the support member 37 and the mount member 38 is substantially 90° (an angle corresponding a state in which the document cover 33 (the automatic document feeder 5) is closed), the engage part 53 protrudes out of the wire opening part 50 (refer to FIG. 5). That is, the wire 51 is set to have a length such that the engage part 53 protrudes out of the wire opening part 50 through a passage specified by the wire guide 52 in a state in which the document cover 33 is closed.

As shown in FIG. 4, the wire guide 52 includes a wire tube 54 and a path changing part 55. The wire 51 is inserted through the wire tube 54. The path changing part 55 directs the upper end of the wire 51 rearward at an upper part of the wire tube 54.

The wire tube 54 is formed into a hollow rectangular cylinder shape. The wire tube 54 extends in the vertical direction across the bearing part 46 and the leg part 47. The wire tube 54 is formed integrally at a center in the horizontal direction of an inner face of a front side of the bearing part 46 and the leg part 47. A lower end of the wire tube 54 is connected to the wire opening part 50 (refer to FIG. 5). An upper end of the wire tube 54 is located substantially at a same level with a shaft center of the rotating shaft 43. The wire tube 54 communicates inside and outside of the mount member 38 through the wire opening part 50.

The path changing part 55 is provided at a center part in the horizontal direction of the support member 37. The path changing part 55 is disposed and fixed at a upper front part of the bearing hole 46a. It is noted that the assist cam 45c is not shown in FIG. 4. The path changing part 55 has a changing part body 55a and a facing part 55b. The changing part body 55a is formed substantially into a shape of a fan when viewed from a side. The facing part 55b is disposed so as to face the changing part body 55a at an upper front side of the changing part body 55a with a gap therebetween. The wire 51 extending from the upper end of the wire tube 54 is in sliding contact with a circumferential face of the changing part body 55a.

Next, a structure for mounting each hinge unit 36 to the document cover 33 will be explained with reference to FIG. 4. A pair of right and left fitting mount portions 56 is formed in the cover frame 34 of the document cover 33. The pair of right and left fitting mount portions 56 corresponds to positions where each hinge unit 36 is mounted. Specifically, each of the fitting mount portions 56 is concavely provided at a rear side of the back face (under face) of the cover frame 34 at the lower side of the conveying mechanism 31 and a lower side of the discharge tray 32. Each of the fitting mount portions 56 is formed into a shape and size into which the support member 37 of the hinge unit 36 can fit. A plurality (three) of screw holes not shown are formed respectively near right and left edge portions of the mount part 56.

The support member 37 of the hinge unit 36 is fitted into the mount part 56. A screw not shown is inserted through each fastening hole 44a formed at each flange 44 of each support member 37. The screw is fastened into each screw hole of the mount part 56. Thereby, the hinge unit 36 is mounted to the document cover 33.

Next, the structure for mounting each hinge unit to the apparatus body 2 will be explained with reference to FIGS. 4 and 5. A pair of right and left insert mount portions 57 is formed through the upper plate 2a of the apparatus body 2. The pair of right and left insert mount portions 57 corresponds to positions where the hinge units 36 are mounted. The insert mount part 57 is formed so as to penetrate through in the vertical direction on a back face side of the upper plate 2a composing an upper face of the apparatus body 2. The insert mount part 57 is formed into a shape and size into which the leg part 47 of the mount member 38 can fit. An internal space S1 of the apparatus body 2 is formed under the upper plate 2a. The leg part 47 penetrates through the insert mount part 57. A lower end of the leg part 47 is located in the internal space S1.

Next, a procedure for mounting each hinge unit 36 to the apparatus body 2 will be explained with reference to FIGS. 4 through 7. It is noted that a state in which each hinge unit 36 is mounted to the document cover 33 is assumed. The following explanation will be made by noticing on one hinge unit 36.

In order to attach the hinge unit 36 to the insert mount part 57, the angle formed between the support member 37 of the hinge unit 36 and the mount member 38 is set to be greater than 90° at first as shown in FIGS. 6 and 7. For instance, the angle formed between the support member 37 and the mount member 38 is set substantially at 150° (an angle formed between a horizontal face and the support member 37 is about 60°). That is, in a case where the automatic document feeder 5 is mounted to the apparatus body 2 through the hinge unit 36, the hinge unit 36 is turned such that the document cover 33 (the automatic document feeder 5) is opened. In this state, the wire 51 whose one end is fixed to the support member 37 is wrapped around the circumferential face of the changing part body 55a and is stretched downward such that the wire 51 makes a U-turn (refer to FIG. 6). That is, the lower end (other end) of the wire 51 is moved upward by being guided by the wire guide 52. Thereby, the engage part 53 formed at the lower end of the wire 51 enters the inside of the wire opening part 50 (refer to FIG. 7). It is noted that in the following explanation, the position where the engage part 53 enters the inside of the wire opening part 50 will be referred to as a 'release position P1' hereinafter.

In this state, the leg part 47 of the hinge unit (the mount member 38) is inserted through the insert mount part 57. When the insertion of each leg 47 advances, the insertion restricting part 48 of the mount member 38 abuts against an upper face (upper end edge of the insert mount part 57) of the apparatus body 2 (the upper plate 2a) and then, the insertion of the leg part 47 to the insert mount part 57 is stopped (refer to FIG. 6). Thereby, the hinge unit 36 is mounted to the apparatus body 2. It is noted that the edge (lower end) of the leg part 47 penetrates the insert mount part 57 and protrudes into the internal space S1. Specifically, the wire opening part 50 formed in the leg part 47 is located at a lower position distant from a lower face of the upper plate 2a by a distance D (refer to FIG. 5).

After that, as shown in FIGS. 4 and 5, when the document cover 33 (the automatic document feeder 5) is closed so as to cover the platen glass 21 and others, the hinge unit 36 turns and the angle formed between the support member 37 and the mount member 38 becomes substantially 90°. Then, the wire 51 moves downward by being guided by the path changing part 55 and the wire tube 54. Thereby, the engage part 53 formed at the lower end of the wire 51 protrudes outside of the wire opening part 50. It is noted the position where the engage part 53 protrudes outside of the wire opening part 50 will be referred to as an 'engage position P2' hereinafter.

Next, an operation of the hinge unit 36 will be explained with reference to FIGS. 4 through 7. It is noted that a case where the operator removes the automatic document feeder 5 out of the apparatus body 2 for maintenance will be explained.

As shown FIGS. 4 and 5, in a case where the operator lifts up the automatic document feeder 5 in a state in which the document cover 33 (the automatic document feeder 5) is closed, the leg part 47 moves upward such that it is pulled out of the insert mount part 57. When the leg part 47 moves upward by the distance D the engage part 53 located at the engage position P2 abuts against the engaged part 58 composed as a right under face of the upper plate 2a. Thereby, the pull-out of the leg part 47 from the insert mount part 57 is restricted. That is, the removal of the automatic document feeder 5 from the apparatus body 2 is prohibited.

By the way, because the automatic document feeder (the document cover 33) is permitted to move upward by the distance D from the platen glass 21 and others (the upper face of the upper plate 2a), a space between the platen glass 21 and the mat 35 of the document cover 33 is separated by the distance D. This arrangement makes it possible to press a thick document such as a book stably on the platen glass 21 for example. It is noted that the distance D is arbitrarily set by considering a maximum thickness of a document whose images are to be read.

In the case where the automatic document feeder 5 is removed from the apparatus body 2, the document cover 33 (the automatic document feeder 5) is opened at first as shown in FIGS. 6 and 7. The engage part 53 moves to the release position P1 by setting the angle formed between the support member 37 and the mount member 38 at about 150° as described above. Next, the operator lifts up the automatic document feeder 5 in this state. Because the engage part 53 is embedded within the wire opening part 50, the engage part 53 will not contact with the engaged part 58 (the under face of the upper plate 2a). Thereby, the leg part 47 can be pulled out of the insert mount part 57. That is, the automatic document feeder 5 can be removed out of the apparatus body 2.

As described above, the detachment restricting mechanism 39 restricts the mount member 38 from being detached from the apparatus body 2 by moving the engage part 53 to the engage position P2 where the engage part 53 can abut against the engaged part 58 formed on the apparatus body 2 when the document cover 33 is closed. The detachment restricting mechanism 39 enables the mount member 38 to be detached from the apparatus body 2 by moving the engage part 53 to the release position P1 where the engage part 53 is unable to abut against the engaged part 58 when the document cover 33 is opened.

According to the hinge unit 36 of the first embodiment described above, the detachment of the mount member 38 from the apparatus body 2 is restricted in the state in which the document cover 33 is closed and the document S is pressed to the platen glass 21, i.e., in the state in which the document cover 33 is used. Meanwhile, in the state in which the document cover 33 is opened, i.e., the state in which the document cover 33 is not used, the mount member 38 can be detached from the apparatus body 2. Thus, it is possible to link whether the engage part 53 is contactable to the engaged part 58 to the opening operation of the document cover 33. Accordingly, it is possible to remove the document cover 33 (the automatic document feeder 5) supported through the mount member 38 and the support member 37 readily from the apparatus body 2 just by opening the document cover 33. This arrangement makes it possible to carry out the work for removing the document cover 33 (the automatic document feeder 5) readily and swiftly in maintenance works for example.

Still further, the hinge unit 36 of the first embodiment is configured such that the wire 51 moves between the engage position P2 and the release position P1 by being guided by the wire guide 52. Because the engagement movable member is the wire 51 having flexibility, it is possible to move the wire 51 by deforming into various shapes depending on the wire guide 52 in a desired path. This arrangement makes it possible to readily draw and dispose the wire 51 even if an enough internal space cannot be assured within the support member and the mount member 38. This configuration is specially effective in a case where the assist mechanism 45 is built in the support member 37 and an internal space of the support member 37 is limited.

It is noted that while the pair of hinge units 36 of the first embodiment is provided horizontally to the cover frame 34 (or the upper plate 2a of the apparatus body 2), a number of the hinge units 36 to be disposed is arbitrary. For instance, the hinge unit 36 may be provided only at one place where weight balances. Still further, the hinge unit 36 of the first embodiment may be used as one of the pair of right and left hinge units, and another hinge unit in which the detachment restricting mechanism 39 is omitted may be used as another hinge unit.

Figure 8:
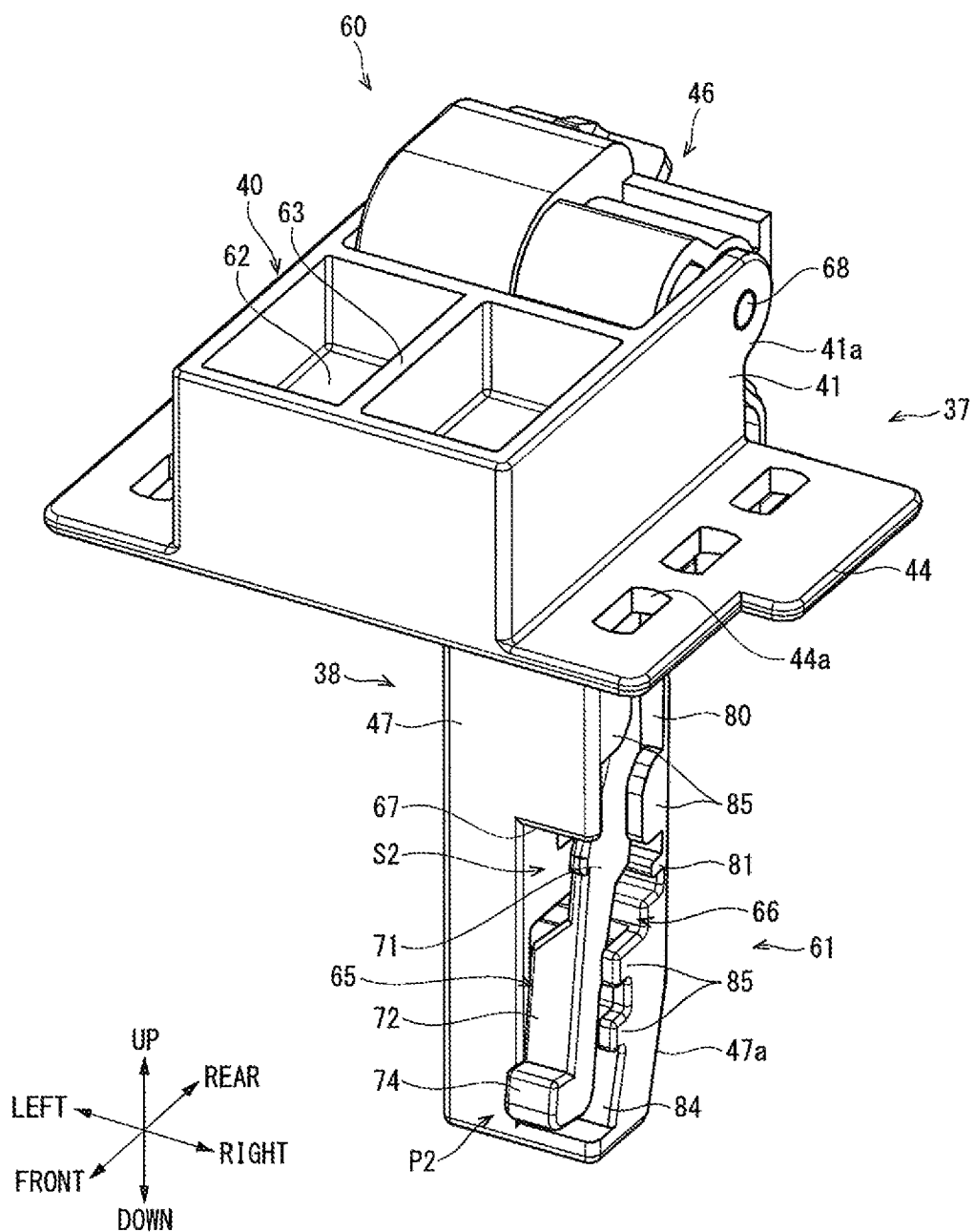
FIG. 8 is a perspective view showing a hinge unit according to the second embodiment of the present disclosure.
Figure 9:
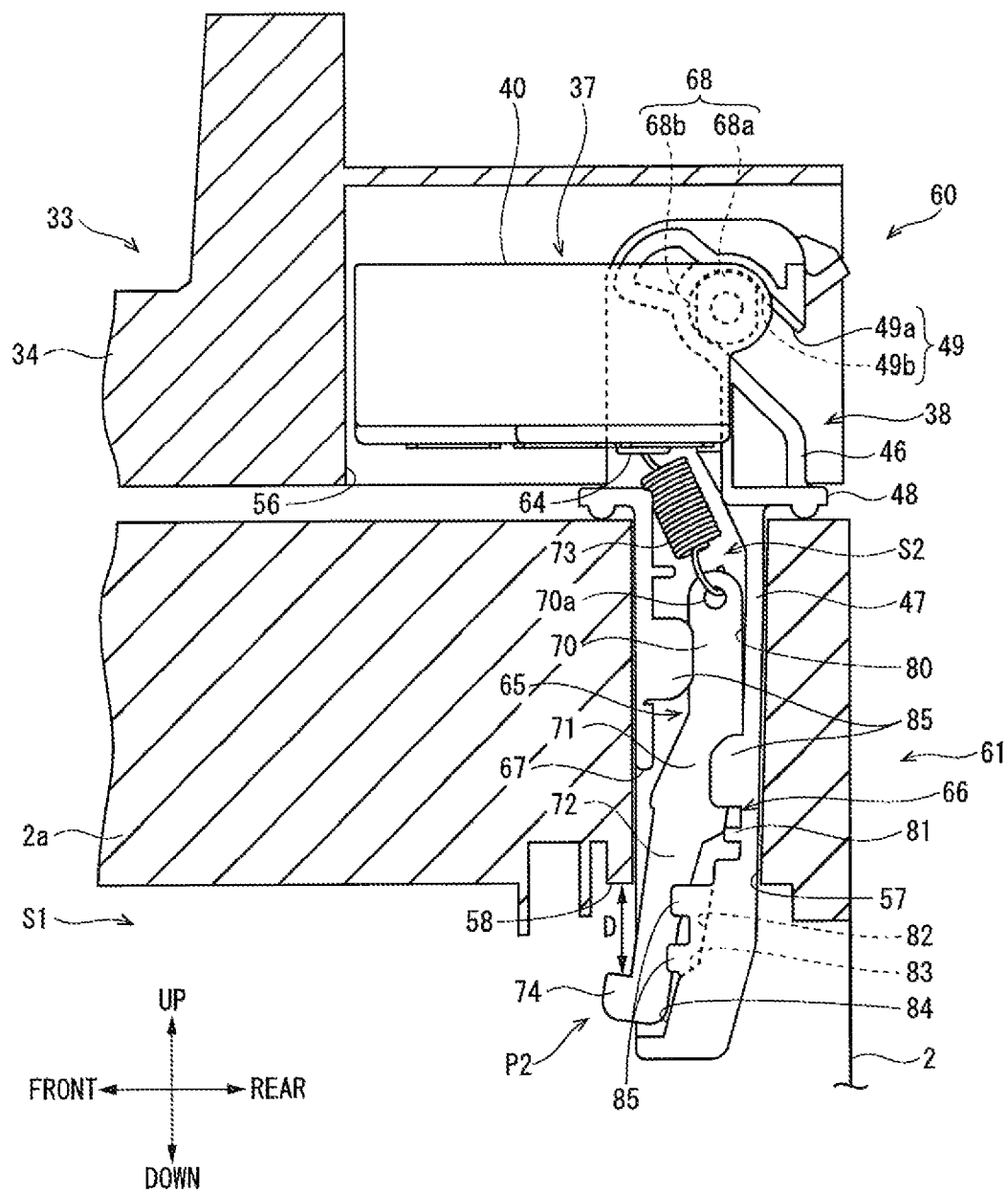
FIG. 9 is a side sectional view schematically showing the hinge unit of the second embodiment of the present disclosure in a state in which a document cover is closed.
Figure 10:
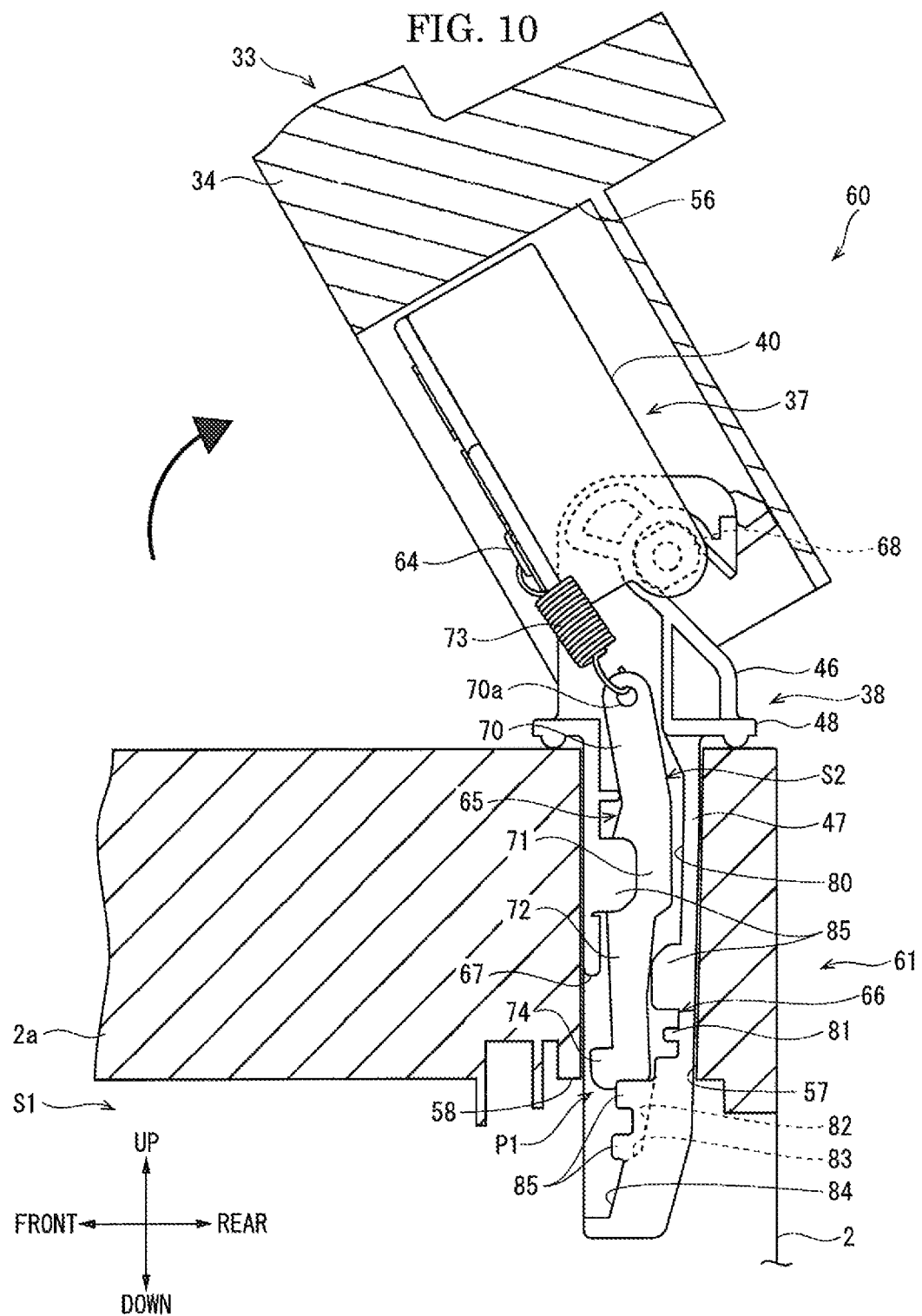
FIG. 10 is a side sectional view schematically showing the hinge unit of the second embodiment of the present disclosure in a state in which the document cover is opened.

Next, a hinge unit 60 of the second embodiment will be described in detail with reference to FIGS. 8 through 10. FIG. 8 is a perspective view showing the hinge unit 60. FIG. 9 is a side sectional view schematically showing the hinge unit 60 (a state in which a document cover is closed). FIG. 10 is a side sectional view schematically showing the hinge unit 60 (a state in which the document cover is opened). It is noted that the same or corresponding components with the hinge unit 36 of the first embodiment will be denoted by the same reference numerals and their explanation will be omitted here.

A configuration of the detachment restricting mechanism 61 is mainly different from the hinge unit 36 of the first embodiment in a hinge unit 60 of the second embodiment. Still further, the top board 42 of the support member 37 and the assist mechanism 45 built in the support member 37 (the fitting part 40) is omitted in the hinge unit 60 of the second embodiment. It is noted that an upper part of the bearing part 46 of the mount member 38 projects out of an upper face of the support member 37.

As shown in FIG. 8, the fitting part 40 of the hinge unit 60 of the second embodiment has a partition plate 62 vertically dividing the inside thereof and a rib 63 horizontally dividing the inside thereof. An engage plate 64 is formed on a rear face of the fitting part 40 (refer to FIG. 9). The engage plate 64 projects rearward from a lower right side of the fitting part 40. A first engage hole not shown penetrates through the engage plate 64.

Right and left both ends of the rotating shaft part 68 of the hinge unit 60 are fixed to a pair of shaft fixing parts 41a. As shown in FIG. 9, the rotating shaft part 68 includes a pair of circumferential parts 68a and a pair of plane parts 68b. The pair of circumferential parts 68a is formed of a circumferential surface of column. The pair of plane parts 68b is formed flatly at a position facing to the column circumferential surface. It is noted that a minimum outer diameter of the rotating shaft part 68 formed of the pair of plane parts 68b is set to be slightly smaller than a width of a bearing groove part 49a of the mount member 38.

As shown in FIG. 9, the mount member 38 of the hinge unit 60 includes a bearing part 49 and a leg part 47. The bearing part 49 is formed into a shape of hook when seen from a side. The leg part 47 extends downward from the bearing part 49.

The bearing part 49 includes the bearing groove part 49a and a bearing body 49b. The bearing groove part 49a is formed such that the bearing groove part 49a is cut front obliquely upward from a lower rear face of a substantially rectangular parallelepiped. The bearing body 49b is formed at an upper end of the bearing groove part 49a. The bearing body 49b forms a substantially columnar space extending in the horizontal direction. The bearing groove part 49a is formed such that the bearing groove part 49a opens the substantially columnar space of the bearing body 49b.

A procedure for assembling the hinge unit 60 will be explained. At first, the operator advances each plane part 68b of the rotating shaft part 68 while being in sliding contact with the bearing groove part 49a of the bearing part 49. As this advancement advances, one circumferential part 68a of the rotating shaft part 68 abuts against an inner circumferential face of the bearing body 49b. Then, if the support member 37 is rotated to put into the state shown in FIG. 9, each plane part 68b of the rotating shaft part 68 shifts in the circumferential direction, so that the bearing groove part 49a is restricted from slipping out. Thereby, the support member is turnably linked to the mount member 38 without detaching from the mount member 38.

As shown in FIGS. 8 and 9, the detachment restricting mechanism 61 of the hinge unit 60 includes an engage movable member 65 and a hook guide 66. The engage movable member 65 is formed into a shape lengthy in the vertical direction by a resin material. The engage movable member 65 moves such that it draws substantially a circular arc between the engage position P2 and the release position P1. The hook guide 66 is provided in the mount member 38. The hook guide 66 guides the move of the engage movable member 65.

The engage movable member 65 is provided within the sliding space S2 formed in the leg part 47 of the mount member 38. The sliding space S2 is formed at a right inner side from the leg part 47 to the bearing part 46. A right side surface of the sliding space S2 is substantially opened to the outside. A hook opening 67 communicating with the sliding space S2 is formed at a lower side of the leg part 47. The hook opening 67 is formed into a rectangular shape when seen a front side. The hook opening 67 extends from the lower end of the leg part 47 substantially to a center in the vertical direction.

As shown in FIGS. 9 and 10, the engage movable member 65 is formed integrally by a vertical part 70 and a bend part 71, an extension part 72. The vertical part 70 is formed substantially into a shape of a plate. The bend part 71 is formed substantially into a shape of a plate slightly bending forward from a lower end of the vertical part 70. The extension part 72 extends downward from the lower end of the bend part 71. That is, the engage movable member 65 is formed so as to bend such that the engage movable member 65 slightly projects rearward as a whole.

The vertical part 70a is formed so as to penetrate through an upper end part of the vertical part 70. A lower end portion of a coil spring 73, i.e., an elastic member, is turnably engaged with the vertical part 70a. An upper end part of the coil spring 73 is turnably engaged with a first engage hole opening to an engage plate 64 of the fitting part 40. Accordingly, the coil spring 73 is provided at the upper end part (one end part) of the engage movable member 65. That is, the engage movable member 65 is rotatably connected to the support member 37 through the coil spring 73.

The extension part 72 is formed widely by projecting in the left direction more than the vertical part 70 and the bend part 71 (refer to FIG. 8). A hooked engage part 74 bending forward substantially at right angles is formed at the lower end part of the extension part 72. The engage part 74 goes in/out of the hook opening 67.

As shown in FIGS. 9 and 10, the hook guide 66 guides a sliding move of the engage movable member 65 within the sliding space S2. The hook guide 66 is constructed as a wall face on a back face composing the sliding space S2. The hook guide 66 includes a vertical guide 80, a convex guide 81, an upper side inclination guide 82, a lower side inclination guide 84, and a plurality of fall preventing pieces 85. The convex guide is provided under the vertical guide 80. The upper side inclination guide 82 extends downward while slightly inclining forward from the lower side of the convex guide 81. The lower side inclination guide 84 extends downward while slightly inclining forward from the lower end of the upper side inclination guide 82 through a stepped part 83. The plurality of fall preventing pieces 85 is formed substantially into a rectangular shape when seen from a side so as to cover a right surface of the sliding space S2.

The vertical part 70 and the bend part 71 of the engage movable member 65 come into sliding contact with the vertical guide 80. The bend part 71 comes in sliding contact with the convex guide 81. The extension part 72 comes in sliding contact with the upper side inclination guide 82, the stepped part 83 and the lower side inclination guide 84. It is noted that the stepped part 83 extends downward while inclining slightly forward.

The plurality of fall preventing pieces 85 are disposed respectively an upper side of the hook opening 67, an upper side of the convex guide 81, an upper part of the upper side inclination guide 82, and the stepped part 83. Each fall preventing pieces 85 prevents the engage movable member 65 from falling out of the sliding space S2.

As shown in FIG. 9, in the state in which the document cover 33 (the automatic document feeder 5) is closed so as to cover the platen glass 21 and others (the angle formed between the support member 37 and the mount member 38 is substantially 90°), the engage part 74 of the engage movable member 65 projects to the outside from the hook opening 67. That is, the engage part 74 faces to the engage position P2.

If the document cover 33 (the automatic document feeder 5) is opened so as to expose the platen glass 21 and others as shown in FIG. 10 (the angle formed between the support member 37 and the mount member 38 is substantially 150°), the vertical part 70 of the engage movable member 65 rotatably connected to the support member 37 is pulled toward front obliquely upper side. Along with that, the entire engagement movable member 65 is moved upward by being guided by the hook guide 66. At this time, the lower end part of the extension part 72 of the engage movable member 65 slides sequentially on the lower side inclination guide 84, the stepped part 83 and the upper side inclination guide 82. Accordingly, the engage part 74 moves upward while substantially drawing an oval orbit convex rearward when seen from a side. Thereby, the engage part 74 of the engage movable member 65 enters the inside of the hook opening 67. That is, the engage part 74 is located at the release position P1.

It is noted that the back face at the lower end part of the extension part 72 slides on the upper side inclination guide 82 and abuts against the stepped part 83 when the engage part 74 is moved from the release position P1 to the engage position P2 (in closing the document cover 33). The lower end part of the extension part 72 is guided on the stepped part 83 and moves forward. In succession, the lower end part of the extension part 72 is guided to the hook opening 67 by the lower side inclination guide 84.

Next, an operation of each hinge unit 60 of the second embodiment will be explained with reference to FIGS. 9 and 10. In the case where the operator lifts up the automatic document feeder 5 in the state in which the automatic document feeder 5 (the document cover 33) is closed for example, the leg part 47 moves upward by the distance D (refer to FIG. 9) similarly to the hinge unit of the first embodiment. Then, the engage part 74 located at the engage position P2 abuts against the engaged part 58. Thereby, the pullout of the leg part 47 from the insert mount part 57 is restricted and the detachment of the automatic document feeder 5 out of the apparatus body 2 is prohibited.

In the case where the automatic document feeder 5 is removed out of the apparatus body 2, the automatic document feeder 5 (the document cover 33) is opened and the engage part 74 is moved to the release position P1 as shown in FIG. 10. It is noted that the engage part 74 moves to the release position P1 when a maximum opening angle of each hinge unit 60, e.g., an angle formed between the horizontal surface and the support member 37 is about 60°. In this state, the operator lifts up the automatic document feeder 5. Because the engage part 74 does not contact with the engaged part 58, the leg part 47 can be smoothly pulled out of the insert mount part 57. That is, the automatic document feeder 5 can be removed out of the apparatus body 2.

The hinge unit 60 of the second embodiment described above makes it possible to move the engage movable member 65 reliably between the engage position P2 and the release position P1. Still further, because the engage part 74 is formed into a shape of hook, it is possible to adequately maintain a state in which the engage part 74 is hooked by the engaged part 58. This arrangement makes it possible to assure the restriction of the detachment of the mount member 38 from the apparatus body 2 in using the automatic document feeder 5 (the document cover 33).

Still further, shifts in each of the front and rear, right and left, and up and down directions generated in the part connecting the support member 37 with the engage movable member 65 in turning the support member 37 and loads accompanying to the shifts, can be absorbed by elastic deformation of the coil spring 73. This arrangement makes it possible to realize smooth linkage of the turn of the support member 37 and the move of the engage movable member 65.

It is noted that while the hinge unit 60 of the second embodiment is configured such that the engage part 74 goes in and out in the front and rear direction, the present disclosure is not limited that. The direction in which the engage part 74 goes in and out is arbitrary and the hinge unit 60 may be configured such that the engage part 74 goes in and out in the horizontal direction from either one side face of right and left side surfaces. In this case, the position where the hook opening 67 is formed is changed in accordance to the in and out direction of the engage part 74. It is noted that while the coil spring 73 is used as the elastic member in the hinge unit 60 of the second embodiment, a linearly formed and stretchable rubber may be used for example instead of the coil spring 73.

<Modification of Second Embodiment>

While the support member 37 is connected with the engage movable member 65 through the coil spring 73 in the hinge unit 60 of the second embodiment, the present disclosure is not limited to that. For instance, the coil spring 73 may be omitted and the support member 37 may be connected with the engage movable member 65 directly in a turnable state not shown.

It is noted that the hinge units 60 of the second embodiment (including the modified example) are provided as a right and left pair to the cover frame 34 (or the upper plate 2a of the apparatus body 2), a number of the hinge units 36 to be disposed is arbitrary. Still further, it is preferable to use the hinge units 60 of the second embodiment (including the modified example) as at least either one among the pair of hinge units. For instance, it is preferable to use the hinge unit 36 attached with the assist mechanism 45 at a lower side of the conveying mechanism 31 and to use the hinge unit 60 from which the assist mechanism 45 is omitted to a lower side of the discharge tray 32 in the automatic document feeder 5 of a small multi-function printer and others. That is, the hinge unit 36 supports a heavy part and the hinge unit 60 supports a light part. This arrangement makes it possible to adequately assist an opening/closing operation of the document cover 33. It is noted that in this case, the detachment restricting mechanism 39 of the hinge unit 36 may be omitted.

While the case where the hinge units 36 and 60 of the present disclosure are applied to the multi-function printer 1 in each embodiment (including the modified example) described above, the present disclosure is not limited to that. For instance, the configuration of the present disclosure is applicable to other image forming apparatuses such as a copier and a printer and other image reading apparatuses such as a scanner. Still further, the present disclosure may be configured such that the automatic document feeder 5 is omitted for example.

While the preferable embodiment and its modified example of the hinge unit and to the image reading apparatus and the image forming apparatus of the present disclosure have been described above and various technically preferable configurations have been illustrated, a technical range of the disclosure is not to be restricted by the description and illustration of the embodiment. Further, the components in the embodiment of the disclosure may be suitably replaced with other components, or variously combined with the other components. The claims are not restricted by the description of the embodiment.

What is claimed is:

1. A hinge unit comprising:
    a support member configured to support a document pressor pressing a document to a document placing surface provided on a housing of an apparatus body openably/closably with respect to the document placing surface;
    a mount member linked turnably to the support member and mounted removably to the housing; and
    a detachment restricting member whose one end part is turnably connected to the support member and including an engage movable member forming an engage part which is hook-shaped at another end thereof;
    wherein the detachment restricting member restricting the mount member from being detached from the housing by moving the engage part to an engage position where the engage part can abut against an engaged part formed on the housing in a case where the document pressor is closed, and allowing the mount member to detach from the housing by moving the engage part to a release position where the engage part cannot abut against the engaged part in a case where the document pressor is opened; and
    the detachment restricting member further includes a hook guide provided in the mount member and guiding the engage movable member moving between the engage position and the release position.

2. The hinge unit according to claim 1, wherein an elastic member is provided at the one end of the engage movable member.

3. The hinge unit according to claim 1, wherein the engage movable member is formed bendingly and moves so as to draw a circular arc between the engage position and the release position.

4. The hinge unit according to claim 1, wherein a distance between the engage part and the engaged part is set at a maximum thickness of a document pressed to the document placing surface by the document pressor and whose images are to be read.

5. An image reading apparatus comprising:
   a hinge unit including:
   a support member configured to support a document pressor pressing a document to a document placing surface provided on a housing of an apparatus body openably/closably with respect to the document placing surface;
   a mount member linked turnably to the support member and mounted removably to the housing; and
   a detachment restricting member whose one end part is turnably connected to the support member and including an engage movable member forming an engage part which is hook-shaped at another end thereof;
   wherein the detachment restricting member restricting the mount member from being detached from the housing by moving the engage part to an engage position where the engage part can abut against an engaged part formed on the housing in a case where the document pressor is closed, and allowing the mount member to detach from the housing by moving the engage part to a release position where the engage part cannot abut against the engaged part in a case where the document pressor is opened; and
   the detachment restricting member further includes a hook guide provided in the mount member and guiding the engage movable member moving between the engage position and the release position.

6. The image reading apparatus according to claim 5, wherein an elastic member is provided at the one end of the engage movable member.

7. The image reading apparatus according to claim 5, wherein the engage movable member is formed bendingly and moves so as to draw a circular arc between the engage position and the release position.

8. The image reading apparatus according to claim 5, wherein a distance between the engage part and the engaged part is set at a maximum thickness of a document pressed to the document placing surface by the document pressor and whose images are to be read.

9. An image forming apparatus comprising:
   a hinge unit including:
   a support member configured to support a document pressor pressing a document to a document placing surface provided on a housing of an apparatus body openably/closably with respect to the document placing surface;
   a mount member linked turnably to the support member and mounted removably to the housing; and
   a detachment restricting member whose one end part is turnably connected to the support member and including an engage movable member forming an engage part which is hook-shaped at another end thereof;
   wherein the detachment restricting member restricting the mount member from being detached from the housing by moving the engage part to an engage position where the engage part can abut against an engaged part formed on the housing in a case where the document pressor is closed, and allowing the mount member to detach from the housing by moving the engage part to a release position where the engage part cannot abut against the engaged part in a case where the document pressor is opened; and
   the detachment restricting member further includes a hook guide provided in the mount member and guiding the engage movable member moving between the engage position and the release position.

10. The image forming apparatus according to claim 9, wherein an elastic member is provided at the one end of the engage movable member.

11. The image forming apparatus according to claim 9, wherein the engage movable member is formed bendingly and moves so as to draw a circular arc between the engage position and the release position.

12. The image forming apparatus according to claim 9, wherein a distance between the engage part and the engaged part is set at a maximum thickness of a document pressed to the document placing surface by the document pressor and whose images are to be read.

\* \* \* \* \*